United States Patent [19]
Cogan

[11] 4,130,740
[45] Dec. 19, 1978

[54] TELEPHONE HANDSET WITH ROTATABLY LOCKING RECEIVER

[75] Inventor: Fredrick T. Cogan, London, Canada

[73] Assignee: Northern Telecom Limited, Montreal, Canada

[21] Appl. No.: 876,211

[22] Filed: Feb. 9, 1978

[51] Int. Cl.² ............................................. H04M 1/03
[52] U.S. Cl. .................................................. 179/103
[58] Field of Search ................................ 179/103, 179

*Primary Examiner*—George G. Stellar
*Attorney, Agent, or Firm*—Sidney T. Jelly

[57] ABSTRACT

A telephone handset is formed from two elongate hollow concave parts, joined at their peripheries, with a circular recess at one end of the lower part having a receiver therein. A cover member fits on the reciver and is rotatable in the recess, and interengaging formations on the cover member and the interior surface of the recess which, on rotation of the cover member, engage and lock the cover member and receiver in the recess.

15 Claims, 9 Drawing Figures

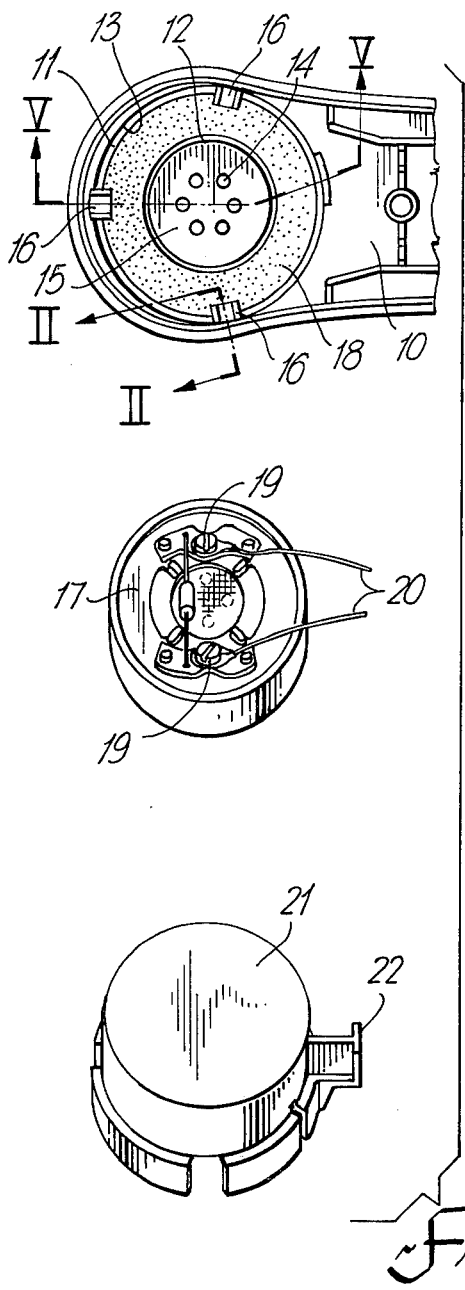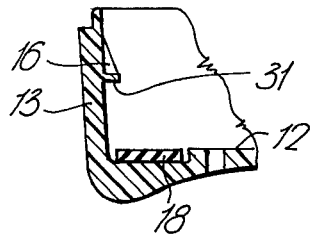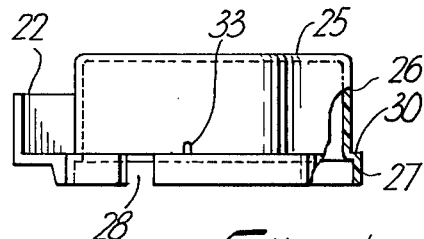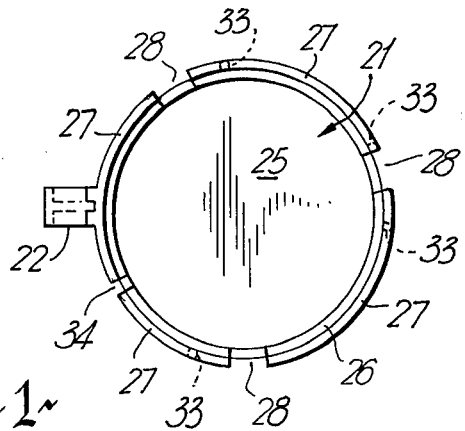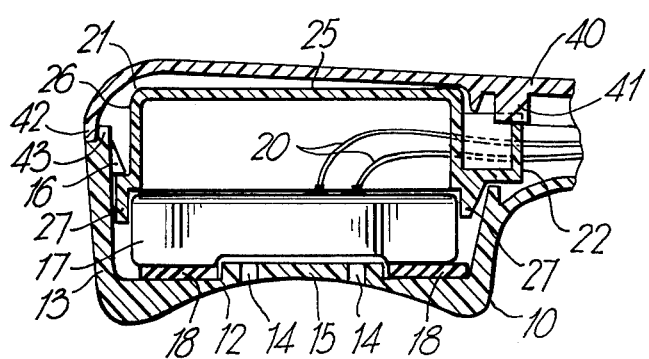

TELEPHONE HANDSET WITH ROTATABLY LOCKING RECEIVER

This invention relates to a telephone handset with a rotatably locking receiver. In particular the receiver is dropped into the receiver recess in the handset and a cover member placed over the receiver, the cover rotated to engage with formations on the handset to lock the receiver in position.

Conventional telephone handsets have an externally open recess into which the receiver fits, and then an external cover is screwed on to the handset. It is necessary, when molding the handset main part, to form a male threaded portion at the end of the recess. The cover member has to be molded with a female threaded portion to suit the male thread on the handset main part. Such threaded portions are expensive to produce, requiring expensive molds.

With the present invention the handset is comprised of two parts with a recess at each end of one part, the recesses opening in an inward direction relative to the handset as a whole. There are no threaded portions and more simple and economic manufacture is possible.

Generally, a telephone handset in accordance with the invention comprises two elongate hollow concave parts, a top part and a lower part, the lower part having a recess at least at one end, opening inwards towards the interior of the handset, a receiver positioned in the recess, and facing towards the base of the recess, a cover member fitting on the receiver and rotatable in the recess, and interengaging formations on said cover and the interior surface of the recess wall, whereby on rotation of the cover member, the formations engage and lock the cover member and receiver in position in the lower part. Conveniently, the other part of the handset can have a formation for engagement with a formation on the cover member both to restrain the cover from rotation to unlock the receiver, and to prevent assembly of the two parts of the handset until the cover member is correctly rotated.

It is also possible to provide a similar recess at the other end of the lower part with a drop-in transmitter held in place by interengaging formations on the transmitter assembly and the other part of the handset. The transmitter assembly in one example comprises a transmitter and a housing held together by a plastic tubular member, the plastic tubular member forming an acoustic seal between housing and transmitter and between transmitter and the recess base.

The invention will be readily understood by the following description of certain embodiments, by way of example, in conjunction with the accompanying drawings, in which:

FIG. 1 is an exploded perspective view of one end of a handset lower part, showing the recess, a receiver, and a cover member or cup;

FIG. 2 is a cross-section through the recess on the line II—II of FIG. 1;

FIG. 3 is a bottom plan view of the cover member or cup;

FIG. 4 is a side view of the cover member or cup;

FIG. 5 is a cross-section through the receiver end of an assembled handset, generally on the line V—V of FIG. 1;

Figure 7:
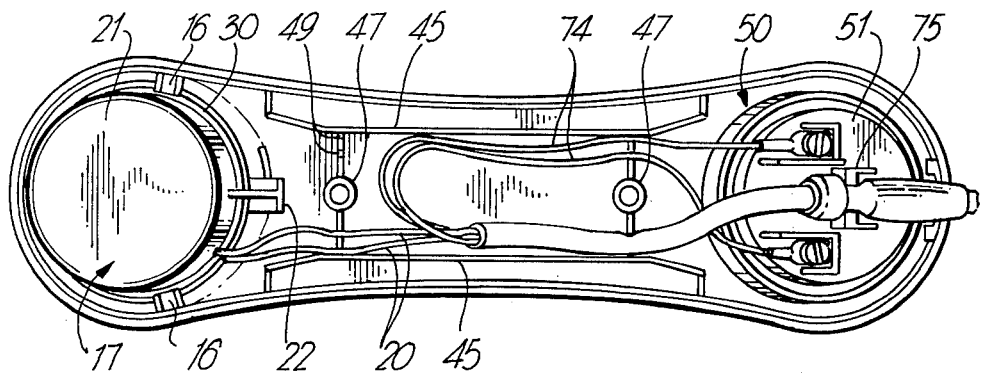
FIG. 7 is a top view of the lower handset part with a transmitter and a receiver in position.

As illustrated in FIG. 1, one end of a lower handset part 10 has a recess 11 opening from the inside of the handset, having a base 12 and side wall 13. Apertures 14 are formed in the central portion 15 of the base 12 for access to a receiver in the recess. Formed on the wall 13 are three lugs or projections 16 spaced round the recess. As will be described, projections 16 are spaced a distance from the base 12 to engage with a cover member or cup.

A receiver 17 fits into the recess 11 resting on a resilient ring 18 positioned on the base 12 around the central portion 15. Connections 19 are provided on the top of the receiver 17 for the conductors 20. A cover member or cup 21 fits onto the receiver and engages with the projections 16. The cup 21 has a radially extending arm 22 by which the cup can be rotated.

The form of a projection 16 can be seen in FIG. 2. All three projections 16 are normally of the same form. As illustrated in FIGS. 3 and 4, the cup 21 has a top member 25 and side wall 26. A rim 27 extends round the base of the wall 26, on the outside of the cup and the arm 22 extends radially near the top of the cup. Slots 28, are formed in the rim, the slots positioned so that when the cup is dropped into the recess over a receiver, each projection 16 will pass through a slot 28. In position the top edge 30 of the rim 27 is level with the bottom surfaces 31 of the projections 16. By rotating the cup by the arm 22 the rim engages under the projections 16. Small pips or projections 33 are formed on the rim 27 to limit rotational movement of the cup. A further slot 34 is provided for passage of the conductors 20 from the receiver.

The arm 22 rests on, and slides on, a short section extending from the wall 13 of the recess 11. This will prevent tipping of the cup when the arm is pushed to rotate the cup.

FIG. 5 illustrates the receiver 17 and cup 21 assembled in recess 11 in the lower handset part 10 and the other or top handset part 40 assembled to the lower part, in cross-section. The engagement of the rim 27 under projections 16 is seen. In rotating the cup a small amount of pressure is maintained on the top 25 of the cup 21 to push the receiver into firm engagement with the resilient ring 18 to provide an acoustic seal.

The top part 40 has a downwardly extending rib 41 which, when the cup 21 is rotated correctly, engages with one side of the arm 22 to prevent rotation back of the cup, with consequent unlocking of cup and receiver. It is not possible to completely close the top part 40 onto the lower part 10 until the arm is rotated to the correct position as the rib 41 will be in interference with the arm 22.

The two parts of the handset are of hollow concave form and are provided with interengaging formations 42 and 43 at their rims to provide location and a seal. The two parts are very easy to mold as compared to many normal handsets which are of one piece construction and formed as a hollow structure. It is necessary, for cost and weight purposes and to provide a passage for conductors, that the portion joining the receiver end and the transmitter end be hollow and this is more difficult and expensive to produce than the relatively inexpensive molding of the handset parts for the present invention.

Figure 6:
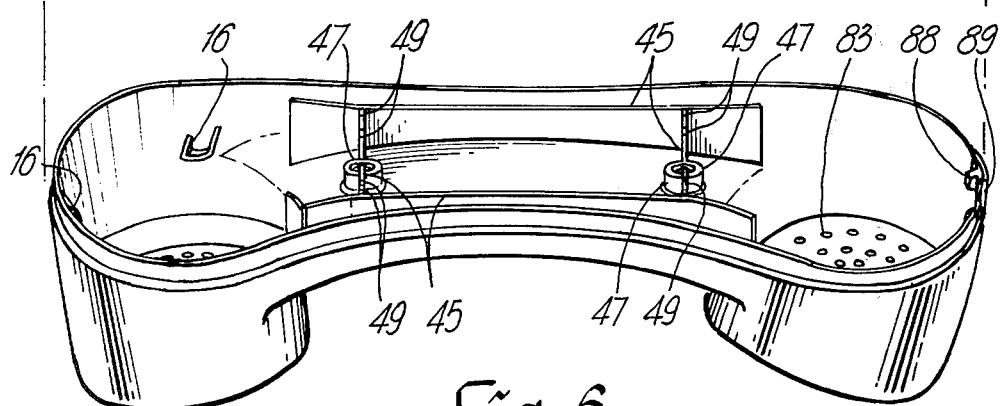
FIG. 6 is a perspective view of the two handset parts.

FIG. 6 illustrates the two parts of a handset, separated, without the transmitter and receiver therein, while FIG. 7 illustrates the lower part of the handset with a transmitter assembly in one end and a receiver in the other end. As seen the two parts are relatively simple moldings with no internal coring required. Stiffening ribs 45 are provided in the portion of the lower part between the recesses. Similarly stiffening ribs 46 are provided in the top part.

Bosses 47 are provided in the lower part in which trapped screws are position, the screws being screwed into further bosses 48 in the top part. Slots 49 are provided in the cross ribs 45 for positioning of conductors therein. With the particular form of attachment of the top part to the lower part, as described hereinafter, only one screw need be provided, near the receiver end, but two are provided, mainly for cosmetic reasons.

Figures 8, 9:
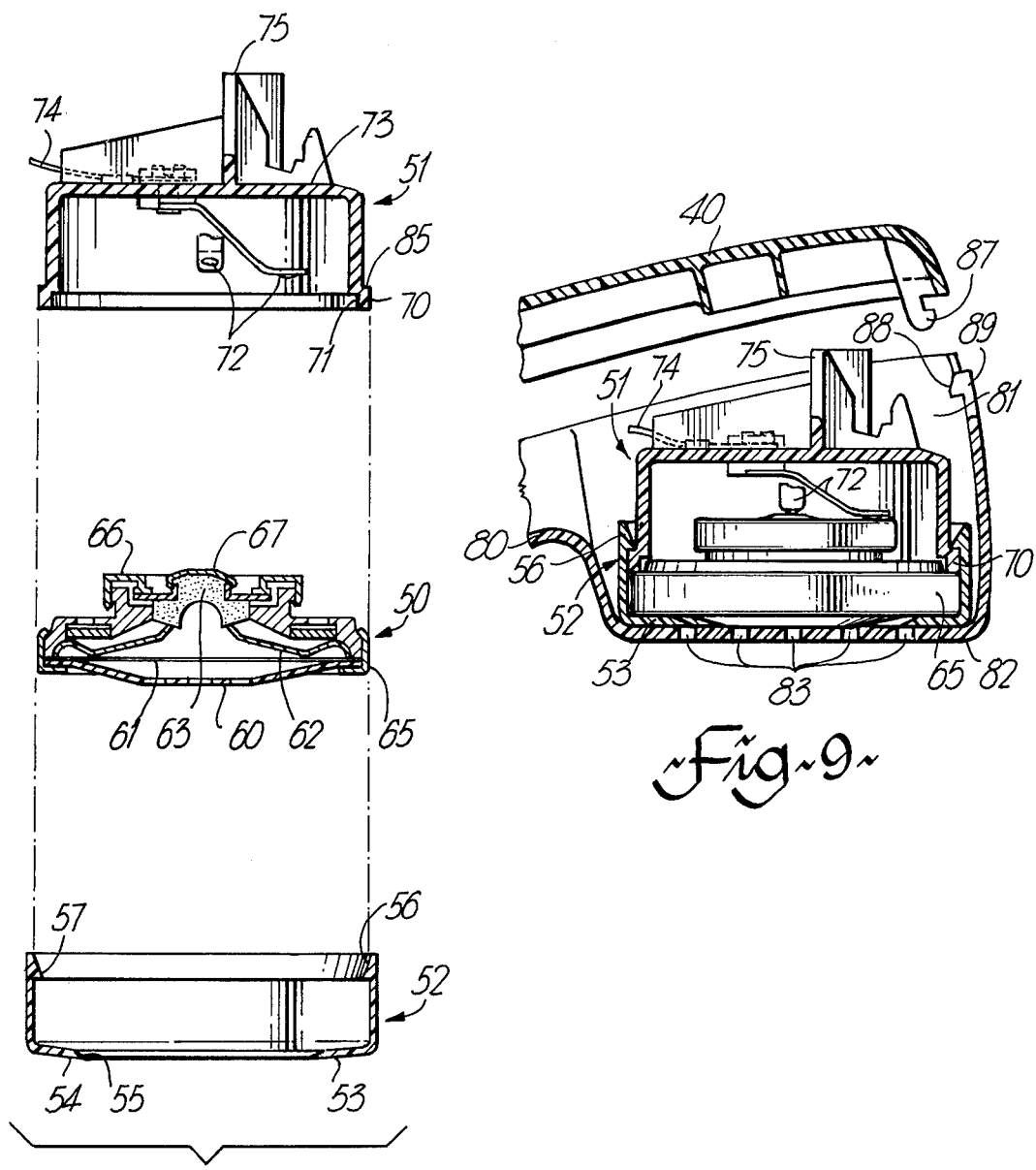
FIG. 8 is an exploded cross-section through one form of transmitter.
FIG. 9 is a cross-section through the transmitter end of the handset, with a transmitter in place.

The particular form of transmitter assembly, as illustrated in FIGS. 8, 9 and 10 comprises a transmitter 50, a cup-shaped member 51 and a flexible tubular gasket 52. The gasket 52 has a radially inwardly projecting rim 53 at its lower end. The rim 53 is slightly domed or curved, presenting a convex outer surface 54. The inner edge of the rim is tapered as shown at 55. The curve and the taper provide a flexible edge for sealing, as will be described.

At the upper end of the gasket there is a further radially inwardly projecting rim 56. Rim 56 is more a thickening of the upper edge, the cross-section being tapered to give an inwardly and downwardly inclined surface 57. The inner diameter of the wall portion between the rims 53 and 56 is a close fit on the outside of the transmitter 50.

The transmitter 50 is of conventional form, having a forward apertured front end 60, a diaphragm 61, a frame 62, carbon chamber 63 held together by a metal rim 65. Contacts 66 and 67 are provided.

The cup-shaped member 51 has a rim 70 which is recessed on its inner surface at 71 to fit over the metal rim 65 of the transmitter. Spring contacts 72 are attached to the inner surface of the end portion 73 of the cup-shaped member, with connections extending through the end portion for attachment of conductors 74. On the back surface of the end portion 73 are two L-shaped projections 75. The projections extend in the axial direction and serve two purposes. Firstly they are spaced apart such that a grommet on the line cord to the handset is gripped firmly between the projections, an enlargement of the grommet engaging behind the projections as seen in FIG. 7, and acting as a strain relief to prevent inadvertent pulling of the various conductors in the handset by the telephone user. Secondly, the projections extend a distance such that on assembly together of the two handset parts, the inner surface of the top part will push on the ends of the projections 75 pressing the transmitter assembly into tight sealing engagement with the base of the recess in the lower part of the handset.

FIG. 9 illustrates the arrangement of the transmitter assembly in the recess in the lower part of the handset with the line cord omitted, for clarity. The lower part of the handset is indicated at 80 with inwardly opening recess 81. The recess 81 has an apertured base 82, the apertures indicated at 83, for transmission of sound therethrough. The transmitter assembly drops into the recess 81 with the outside diameter of the gasket 52 being a fairly close fit in the recess. The transmitter assembly is assembled by pressing the transmitter 50 into the gasket past the top rim 56, the apertured front 60 extending within the rim 53 of the gasket. The rim 70 of the cup-shaped member 51 is then pushed into the gasket 52, the rim 56 snapping over the rim 70 and engaging with the back surface 85 of the rim.

In the particular example illustrated, the top part is attached to the lower part at one end, in the present example the transmitter end, by two spaced hooked members 87 which engage under projections 88 on the inside of the recess 81. The projections are more readily seen in FIGS. 6 and 9, being positioned either side of a slot 89 in the end of the handset part in which fits the grommet 90 of the line cord 91.

After positioning the transmitter assembly into the recess 81, the line cord grommet is pressed down into the slot 89 and also between the projections 75 on the cup-shaped member 51. The top part is then presented to the lower part in such a manner that the hooked members 87 engage under the projections 88. The top part is then rotated down into engagement with the lower part and the inner surface of the top part, engages with, and presses down on the top of the projections 75. This pressure flexes the tapered rim 53 on the gasket 52 against the base 82 of the recess, giving a good acoustic seal.

What is claimed is:

1. A telephone handset having an elongate top part and an elongate lower part, each part of hollow concave form and adapted to fit together at their peripheries, said lower part housing a receiver and a transmitter; said lower part formed at one end to define a circular recess having a perforated base and a side wall extending upward from said base; a receiver positioned in said recess and facing towards said base; a cover member fitting on said receiver and rotatable about a central axis in said recess; and interengaging formations on said cover and on an inner surface of said side wall, whereby on rotation of said cover member said formations of the cover member engage with said formations on the inner surface of the side wall and lock the cover member and receiver in position.

2. A handset as claimed in claim 1, including a resilient gasket positioned between said receiver and said base surface of the recess.

3. A handset as claimed in claim 1, said cover member including a radially extending arm, said cover member rotatable by said arm.

4. A handset as claimed in claim 3, including a formation on an inner surface of said top part for engagement with said radially extending arm.

5. A handset as claimed in claim 1, said interengaging formations comprising projections on said inner surface, each projection including a surface facing towards said base, and a rim portion on said cover member, said rim portion including an upwardly facing surface for engagement under said surface on each projection, and slots through said rim for passage of said projections therethrough.

6. A handset as claimed in claim 5, said cover member of hollow cup-shaped form, said rim portion fitting on the receiver.

7. A handset as claimed in claim 1, said lower part formed at its other end to define a circular recess having a perforated base and a side wall extending upward from said base, and a transmitter assembly in said recess, said transmitter assembly comprising: a transmitter having a front face facing towards and in close proximity to said base, a cup-shaped member positioned on the back of the transmitter, and a resilient tubular member surrounding the transmitter and at least the lower part of the cup-shaped member, said tubular member including a first radially inward projecting rim at a forward end extending over the periphery of the front face of the transmitter and having a front face in contact with said base and a second radially inward extending rim at a rear end engaging over a forward part of the cup-shaped member, to retain said transmitter and said cup-shaped member together and acoustically sealing between said transmitter and said cup-shaped member.

8. A handset as claimed in claim 7, said first radially inward projecting rim having a tapered radial cross-section, for flexibly sealing against said base of said recess.

9. A handset as claimed in claim 8, said front face of said first rim convex in a radial cross-section.

10. A handset as claimed in claim 7, including projections extending upward from a top surface of said cup-shaped member, and rib members on said top part of the handset in engagement with and pressing down on said projections when the two handset parts are assembled.

11. A handset as claimed in claim 10, said projections comprising two spaced apart projections for engagement by a grommet on a handset cord for strain relief.

12. A handset as claimed in claim 1, said lower part formed at each end to define a recess at each end, each recess having a base and a side wall, and interengaging formations at one end of each of said top and lower parts.

13. A handset as claimed in claim 12, said interengaging formations at said end of the top and bottom parts, comprising: inwardly directed projections on the inside of the side wall of the recess at said end, and hook members on the end of said top member, said hook members engaging under said projections.

14. A handset as claimed in claim 13, including a slot in said side wall for reception of a handset cord therein, said inwardly directed projections spaced apart, one on each side of said slot.

15. A handset as claimed in claim 12, said interengaging formations at the end housing said transmitter.

* * * * *